US010475447B2

(12) United States Patent
Ji et al.

(10) Patent No.: US 10,475,447 B2
(45) Date of Patent: *Nov. 12, 2019

(54) ACOUSTIC AND DOMAIN BASED SPEECH RECOGNITION FOR VEHICLES

(71) Applicant: Ford Global Technologies, LLC, Dearborn, MI (US)

(72) Inventors: An Ji, Novi, MI (US); Scott Andrew Amman, Milford, MI (US); Brigitte Frances Mora Richardson, West Bloomfield, MI (US); John Edward Huber, Novi, MI (US); Francois Charette, Tracy, CA (US); Ranjani Rangarajan, Dearborn, MI (US); Gintaras Vincent Puskorius, Novi, MI (US); Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,654

(22) Filed: Jan. 25, 2016

(65) Prior Publication Data

US 2017/0213551 A1    Jul. 27, 2017

(51) Int. Cl.
| G10L 15/22 | (2006.01) |
| B60W 50/10 | (2012.01) |
| G10L 15/01 | (2013.01) |
| G10L 15/14 | (2006.01) |
| G10L 15/183 | (2013.01) |

(52) U.S. Cl.
CPC ............ *G10L 15/22* (2013.01); *B60W 50/10* (2013.01); *G10L 15/01* (2013.01); *G10L 15/14* (2013.01); *G10L 15/183* (2013.01); *B60W 2540/02* (2013.01); *G10L 2015/226* (2013.01)

(58) Field of Classification Search
USPC ........................ 704/246, 247, 251, 252, 255
See application file for complete search history.

(56) References Cited

U.S. PATENT DOCUMENTS

| 6,587,824 B1 * | 7/2003 | Everhart ................. G10L 15/07 704/243 |
| 7,392,188 B2 * | 6/2008 | Junkawitsch ........... G10L 15/20 704/251 |
| 7,676,363 B2 | 3/2010 | Chengalvarayan et al. |

(Continued)

FOREIGN PATENT DOCUMENTS

WO     2016144988 A1    9/2016

OTHER PUBLICATIONS

Riccardi, Giuseppe, Active and Unsupervised Learning for Automatic Speech Recognition, CiteSeerx, http://citeseerx.ist.psu.edu/viewdoc/summary?doi=10.1.1.1.2269, 2003.

(Continued)

*Primary Examiner* — Leonard Saint Cyr
(74) *Attorney, Agent, or Firm* — Frank Lollo; Brooks Kushman P.C.

(57) ABSTRACT

A processor of a vehicle speech recognition system recognizes speech via domain-specific language and acoustic models. The processor further, in response to the acoustic model having a confidence score for recognized speech falling within a predetermined range defined relative to a confidence score for the domain-specific language model, recognizes speech via the acoustic model only.

12 Claims, 6 Drawing Sheets

(56) References Cited

U.S. PATENT DOCUMENTS

| | | | |
|---|---|---|---|
| 8,005,673 B2* | 8/2011 | Nagashima | 704/231 |
| 8,396,713 B2* | 3/2013 | Goel | G10L 15/1822 704/246 |
| 8,407,051 B2* | 3/2013 | Inoue | G10L 15/22 704/241 |
| 8,423,362 B2 | 4/2013 | Chengalvarayan et al. | |
| 8,548,806 B2* | 10/2013 | Nagashima | G10L 15/32 704/235 |
| 2002/0059068 A1* | 5/2002 | Rose | G10L 15/08 704/246 |
| 2004/0138882 A1 | 7/2004 | Miyazawa | |
| 2008/0004875 A1 | 1/2008 | Chengalvarayan et al. | |
| 2008/0071536 A1* | 3/2008 | Nagashima | G10L 15/32 704/246 |
| 2008/0177541 A1* | 7/2008 | Satomura | 704/251 |
| 2008/0270135 A1* | 10/2008 | Goel | G10L 15/1822 704/257 |
| 2009/0030688 A1 | 1/2009 | Cerra et al. | |
| 2009/0150024 A1* | 6/2009 | Kojima | B60H 1/00642 701/36 |
| 2011/0208525 A1* | 8/2011 | Inoue | G10L 15/22 704/249 |
| 2011/0288867 A1* | 11/2011 | Chengalvarayan | G10L 15/063 704/251 |

OTHER PUBLICATIONS

Cronen-Townsend, Steve, et al., Predicting Query Performance, ACM Digital Library, SIGIR 2002 Proceedings of the 25th Annual International ACM SIGIR Conference on Research and Development in Information Retrieval, http://dl.acm.org/citation.cfm?id=564429.

Search Report for United Kingdom Application No. GB1701141.2, dated Jul. 28, 2017, 3 Pages.

* cited by examiner

ACOUSTIC AND DOMAIN BASED SPEECH RECOGNITION FOR VEHICLES

TECHNICAL FIELD

The present disclosure relates to acoustic and domain based approaches to speech recognition.

BACKGROUND

A speech recognition system may interpret audible sounds as commands, instructions, or information originating from a vehicle passenger. Speech may be difficult to discern when ambient noises muffle the speech. Vehicle state information may be used to improve the recognition of speech. Vehicle state information, however, may impede accurate speech recognition under certain circumstances.

SUMMARY

A speech recognition system for a vehicle includes a processor programmed to recognize speech via domain-specific language and acoustic models, and configured to, in response to the acoustic model having a confidence score for recognized speech falling within a predetermined range defined relative to a confidence score for the domain-specific language model, recognize speech via the acoustic model only.

A speech recognition system includes a processor programmed with domain-specific language and acoustic models, and configured to, in response to receiving a signal containing speech, create a domain-specific confidence score using a vehicle state input fed machine-learning algorithm and select one of a plurality of speech recognition paths associated with potential outcomes of the models based on a composite of the domain-specific confidence score and an acoustic model confidence score.

A speech recognition method includes executing by a processor a vehicle command identified from a signal containing speech according to a recognition hypothesis selected from a plurality of recognition hypotheses each based on a product of a common speech domain pair including one of a plurality of domain-specific language model confidence scores derived from application of a machine-learning algorithm to vehicle state inputs and one of a plurality of acoustic model confidence scores.

DETAILED DESCRIPTION

Figure 1:
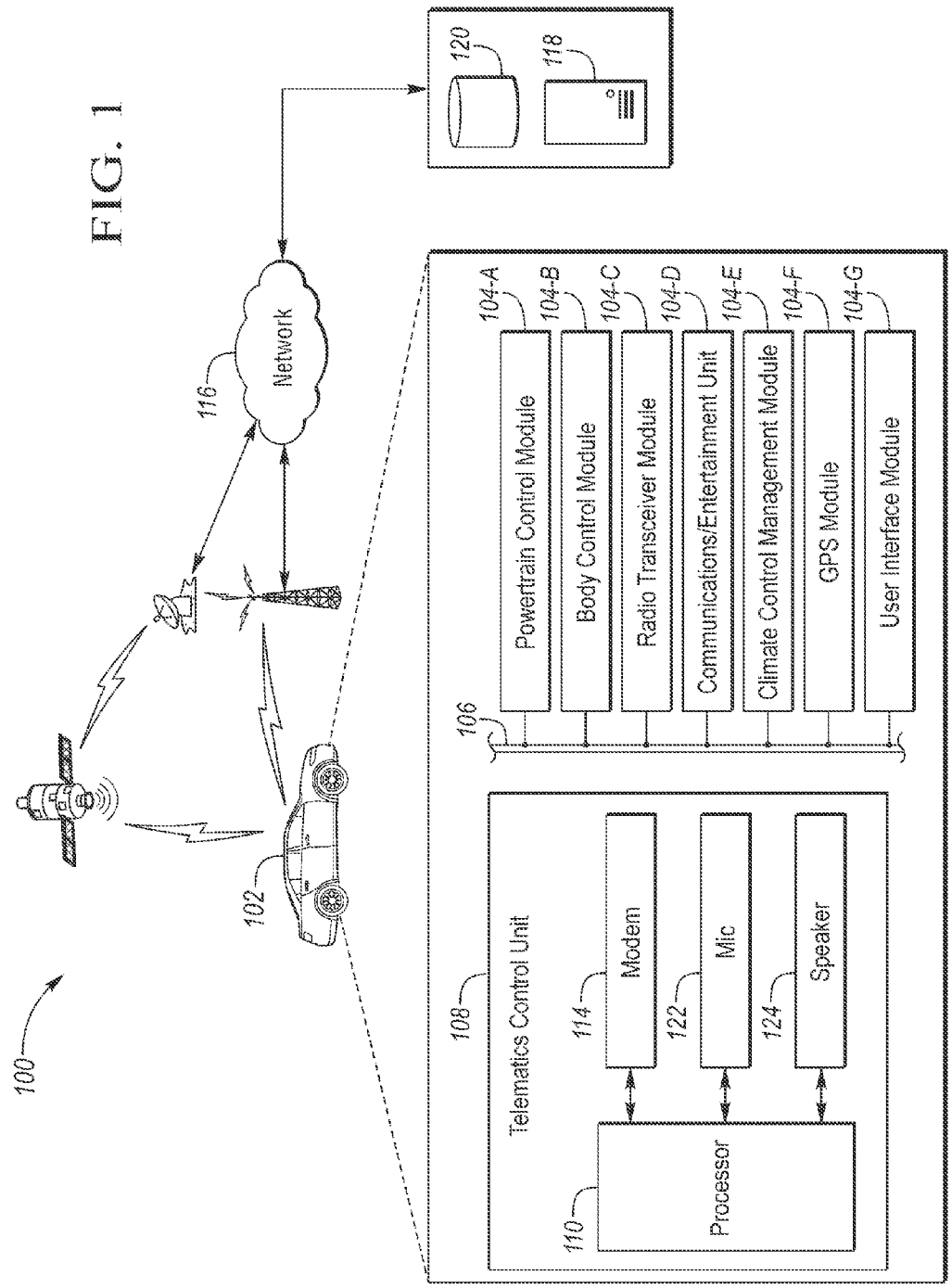
FIG. 1 is a schematic diagram depicting an example of a vehicle having an automatic speech recognition system.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automatic, or manual, speech recognition has become a valued accessory in modern vehicles. Speech recognition may provide hands-free input and interaction between the vehicle and a passenger. Various types of vehicles may utilize speech recognition. For example, an aircraft, watercraft, spacecraft, or land-based vehicle may benefit from recognizing voice instructions from passengers. These vehicles may include numerous functions that may be accessed or invoked using human machine interfaces. Human machine interfaces may include automatic speech recognition systems that decode or translate human speech into instructions that the vehicle or auxiliary systems can comprehend. Ambient noise from the vehicle's systems or environment may decrease the accuracy of automatic speech recognition systems employing acoustic models.

A microphone, or microphones, may be used to convert sounds from the passenger into electrical signals. The microphone may be located on a passenger's mobile device or through the vehicle. A microphone may convert received sound signals into digital voice data and send that data on the communications bus, or a mobile device may send digital voice data to the communications bus of the vehicle. The mobile device may be connected to the vehicle data bus via a wired or wireless connection (e.g., Bluetooth, Wi-Fi, ZigBee, Ethernet, etc.). A speech recognition server, processor, controller, or system may be located locally, on the vehicle, or remotely, at a datacenter. The local speech recognition server may be connected to the communications bus to receive digital voice data. For the remote server, a vehicle telematics unit may be used as an interface between the vehicle and a speech recognition server. The speech recognition system may transmit received speech from a passenger near or inside the vehicle to a local or remote recognition server. The server may then transmit the recognized speech back to the vehicle.

A server may be configured to send and receive data from any number of clients. The server may be connected to a DataMart, data store, or data warehouse as a repository for server data. Any number of clients may enter information into the data store in order to provide enhanced and accurate speech recognition. The speech recognition process may be located on a server accessible via the Internet or within the vehicle itself.

The speech recognition system may be configured to automatically convert recognized speech into readable text or machine code. Modern speech recognition systems may use a combination of recognition models to recognize speech. One type of model may derive from a lexicon having a listing of recognizable words or phrases. Another type of model may derive from a statistical analysis of the acoustic properties contained within the audio signal. These speech recognition systems may be implemented in vehicles to recognize passenger instructions or communications by using a decoder algorithm as is known in the art.

Vehicles may use speech recognition to determine desired vehicle behaviors from a passenger. For instance, speech recognition may instruct the vehicle to cool down the vehicle cabin, or call a close friend. Speech recognition may provide indication of a desired destination or instructions on a desired route without requiring user input.

Vehicles may include a domain-specific language model capable of aggregating relevant state inputs to improve speech recognition. The automatic speech recognition system may use a previously learned or learned-on-the-fly-statistical model to predict a domain-specific speech recognition model, which more accurately determines the speech of a passenger. A statistical analysis of the relevant state inputs may allow an automatic speech recognition system to narrow the acoustic or lexicon model search.

State inputs may include engine status information, heating, ventilation, or cooling status, vehicle movement status, external or internal indicator status, window wiper status, ambient condition information, window or door position, cabin acoustics, seat position, or other vehicle information received by the vehicle computer. State inputs may also include infotainment system status, conversational history, weather, location, traffic, portable devices, or any other information that may be used to improve speech recognition. State inputs may include nomadic devices or mobile devices in proximity to the vehicle. These state inputs may be related to vehicle commands or vehicle systems.

A domain-specific confidence score may be obtained through a number of statistical processes, machine-learning algorithms (MLA), or artificial neural network (ANN) performed by a processor or controller of the vehicle or a remote server. For instance, a controller may add the number of the relevant state inputs indicative of a specific domain and divide them by the total number of available state inputs to return a domain-specific confidence score. As another example of a statistical process, the controller may weight specific relevant state inputs that are determined to be particularly useful in narrowing an anticipated domain-specific model. A relevant state input that may be weighted could be vehicle speed. Since it is much more likely that a person in a traffic jam may be interested in finding directions, the state input related to low vehicle speed may be given higher priority over other higher vehicle speeds. GPS may also be an indicator of a traffic jam or other cloud based data. A second state input given high priority could be an extreme temperature indicator. A vehicle exposed to extreme temperatures may require a high confidence score related to interior climate control. It is possible that the system would assign a high confidence score to an extreme temperature state input. Any other method of determining a domain-specific score known to those with skill in the art may be used. An acoustic confidence score may be obtained through the plethora of methods as known in the art. A MLA may be applied to adjust the domain-specific scores and outputs based on feedback or a set of algorithms implemented in the factory or updated on the road. An ANN may be applied to adjust the domain-specific scores and outputs based on an input layer, hidden layer, and output layer. The layers may be configured to map state inputs to relevant domain-specific language models.

A confidence score or confidence measure indicates, through numerical or statistical methods, the probability or likelihood of an accurate or precise recognition of speech or parameter. For instance, a confidence score may indicate the level of accuracy an acoustic model has recognized speech. These methods are well known in the art and continue to evolve. A confidence score may indicate the most relevant domain for a given speech recognition.

Although a domain-specific model can provide enhanced accuracy to speech recognition. A domain-specific model generally provides enhanced speech recognition in noisy environments because acoustic or lexicon model recognition may have low confidence scores due to ambient noise. A domain-specific model reduces the likelihood of poor recognition by tailoring the recognition to particular domains by analyzing relevant state inputs of the vehicle. A domain-specific model may highjack, supplant, or usurp an acoustic or lexicon model recognition that would otherwise have a high level of accuracy. An absolute application of a domain-specific model may cause otherwise adequate acoustic or lexicon models to be usurped by a domain-specific model. A speech recognition system may use confidence scores to prevent overuse of domain-specific models.

Referring to FIG. 1, a vehicle 102 may include a telematics control unit 108, a powertrain control module 104-A, a body control module 104-B, a radio transceiver module 104-C, a communications and entertainment unit 104-D, a climate control management module 104-E, a GPS module 104-F, and a user interface module 104-G. The vehicle 102 may be communicatively connected through a network 116 to a speech recognition server 118 that has a data store 120 for holding rating data. The network 116 may be a local controller area network, cellular network, or the Internet. Data may be transmitted over any physical medium using wireless protocols (802.11, Bluetooth, GSM, or CDMA) or wired protocols. Data may be formed into packets and have guaranteed delivery (TCP). Data may be stored in the data store 120 using a SQL database or other similar relational database architecture. The telematics control unit 108 may include a processor 110 and a modem 114 to recognize speech. The processor may be used to package data for transmittal to the server 118 or recognize speech on its own. A microphone 122 may be used to convert an acoustic signal into a digital or analog electrical signal. The microphone may be connected to one of the modules 104 or the telematics unit 108 to allow automatic speech recognition of the signal. A speaker 124 may be used to provide indications to the passengers of the vehicle.

Figure 2:
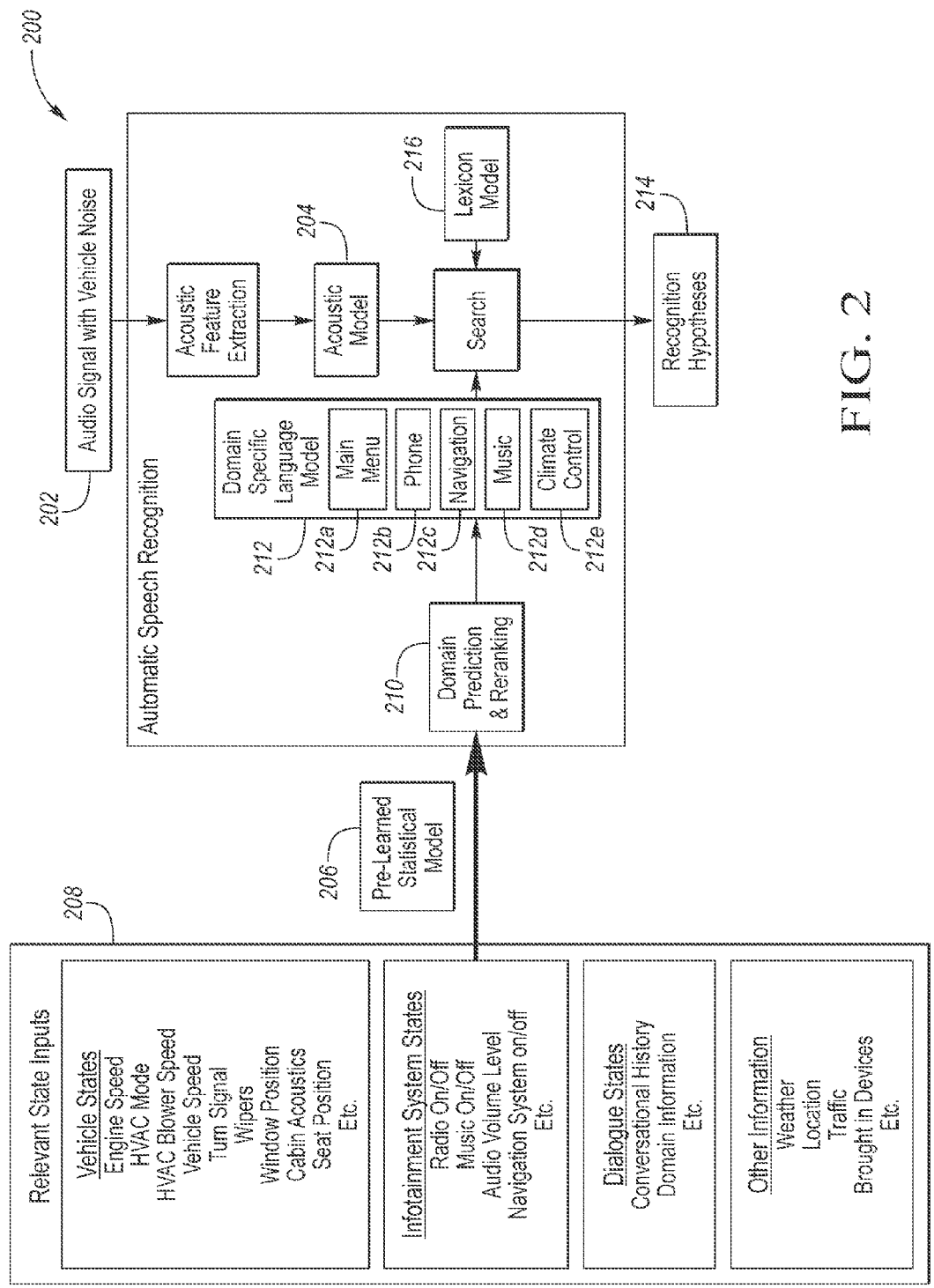
FIG. 2 is a schematic diagram depicting an example of an automatic speech recognition system.

Referring to FIG. 2, a schematic example of an automatic speech recognition system 200 is depicted. An audio signal 202 is received from the microphone 122 of the vehicle or mobile device. The audio signal 202 may include ambient noise. Acoustic features are extracted to form an acoustic model 204. In tandem or sequentially, a domain-specific statistical model 206 may be applied to relevant state inputs 208 to perform domain prediction and re-ranking 210. A domain-specific language model 212 may be formed with particular domains 212a-212e identified. A recognition hypothesis 214 may be determined through utilization of the domain-specific language model 212, the acoustic model 204, and a lexicon model 216.

Figure 3:
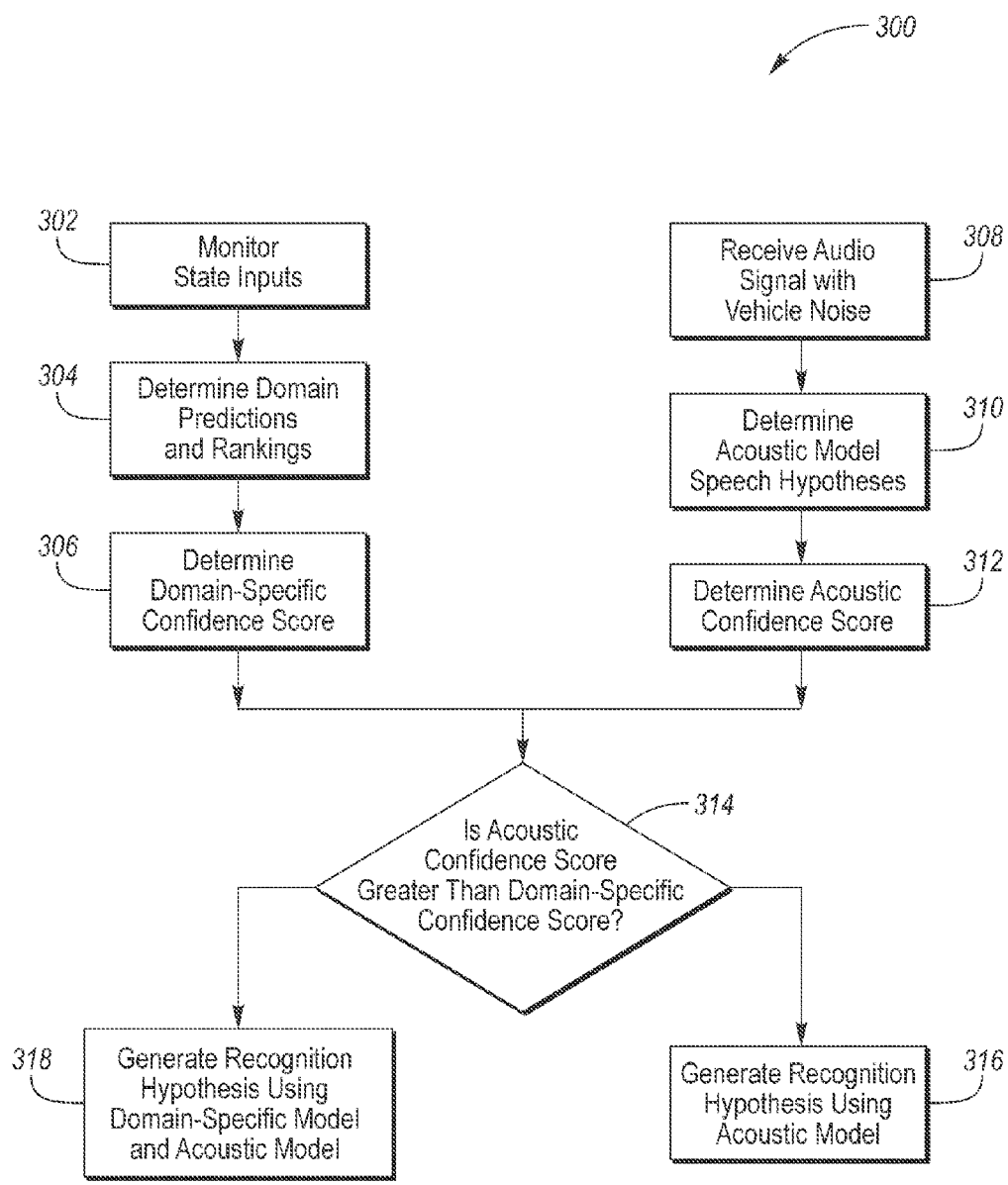
FIG. 3 is a flow diagram of an automatic speech recognition system.

Referring to FIG. 3, a flow diagram 300 depicts an algorithm for speech recognition. The steps may be performed simultaneously or sequentially. In step 302, the state inputs are monitored. State inputs may be assigned a TRUE/FALSE indicator or an ON/OFF indicator. In step 304, the state inputs may be used to determine a domain prediction and ranking. In step 306, the domain-specific confidence score is determined using the domain prediction and ranking algorithm. In step 308, the processor may receive an audio signal from the vehicle. In step 310, the processor may determine an acoustic model speech hypothesis. In step 312, an acoustic model confidence score is derived from the acoustic model speech hypothesis or determined independently. In step 314, a processor may determine whether the acoustic confidence score is greater than the domain-specific confidence score. If it is determined that the acoustic confidence score is greater than the domain-specific confidence score, then the speech hypothesis will be generated using the acoustic model, as shown in step 316. If it is determined that the acoustic confidence score is less than the domain-specific confidence score, then the speech hypothesis will be generated using both the domain-specific model and the acoustic model, as shown in step 318. Instead of comparing magnitudes of confidence scores, as shown in step 314, a processor may supplant the domain-specific model when the confidence score of the acoustic model falls within a predetermined range or value relative to the domain-specific model in step 314. For instance, if an acoustic confidence score is 60% and the domain-specific model has a confidence score of 40%, the system may choose to use the both the acoustic model and the domain-specific model to generate a speech hypothesis. This is because the predetermined range or predefined value may equal a 20% difference between the domain-specific confidence score and the acoustic confidence score. The processor may make the same determination at step 314 if the predetermined range was 20% and the acoustic confidence score was 80% and the domain-specific confidence score was 60%. The system may not use the domain-specific confidence score, however, if the domain specific confidence score was 59% and the acoustic confidence score ("ACS") was 80% because the acoustic model does not fall within the predetermined range relative to the domain-specific confidence score. The server or vehicle may adjust this predetermined range if a learning algorithm determines a substantial number of incorrect iterations of the speech recognition algorithm based on user feedback. This means the predetermined range may be a function of the ACS, the DSCS, or both. For instance, the predetermined range could be a different scalar acoustic confidence score relative to a domain-specific confidence score ("DSCS") (e.g., 10%, 15%, or 30%). The predetermined range ("PR") may also be computed as a function of the domain specific confidence score. For instance, the predetermined range may follow an equation as depicted in Equation 1.

$$PR = (ACS \times 2) - DSCS \qquad \text{Equation 1}$$

Figure 4:
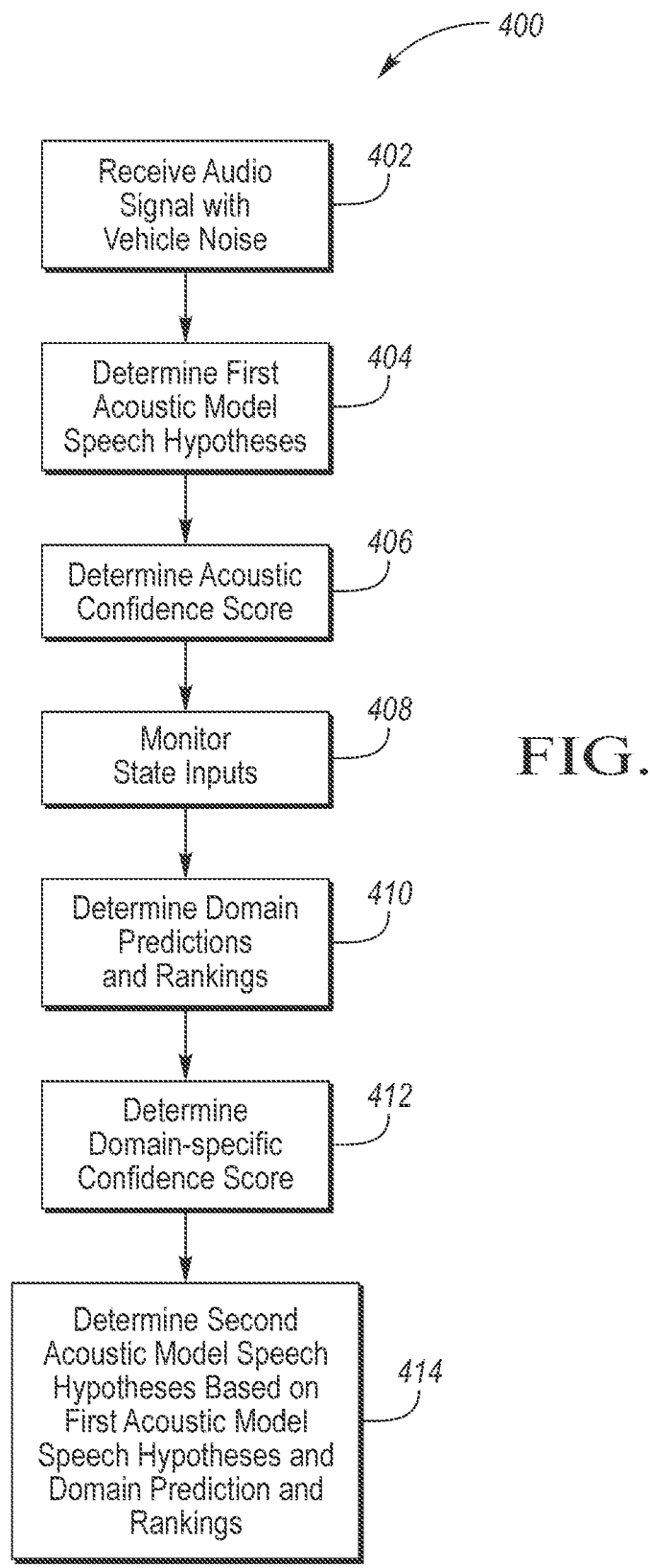
FIG. 4 is a flow diagram of an automatic speech recognition system having more than one acoustic model hypothesis.

Referring to FIG. 4, an algorithm for speech recognition 400 is depicted. In step 402, a speech recognition system receives an audio signal or data from the vehicle. In step 404, a first acoustic model speech hypothesis is determined for a first word, phrase, sentence, or series of sentences. In step 406, an acoustic confidence score is determined. In step 408, state inputs are monitored to determine domain predictions and rankings. Domain predictions and rankings are determined in step 410. A domain-specific confidence score is determined in step 412. A second acoustic hypothesis may be determined by a first acoustic model prediction and a domain-specific model prediction in step 414. Use of the second acoustic hypothesis may be determined by using a method similar to the method disclosed above. In order to determine the best domain-specific model to be used, the confidence score associated with both the domain-specific model and the first acoustic model may be multiplied. The group with the highest combined confidence score may be used.

Figure 5:
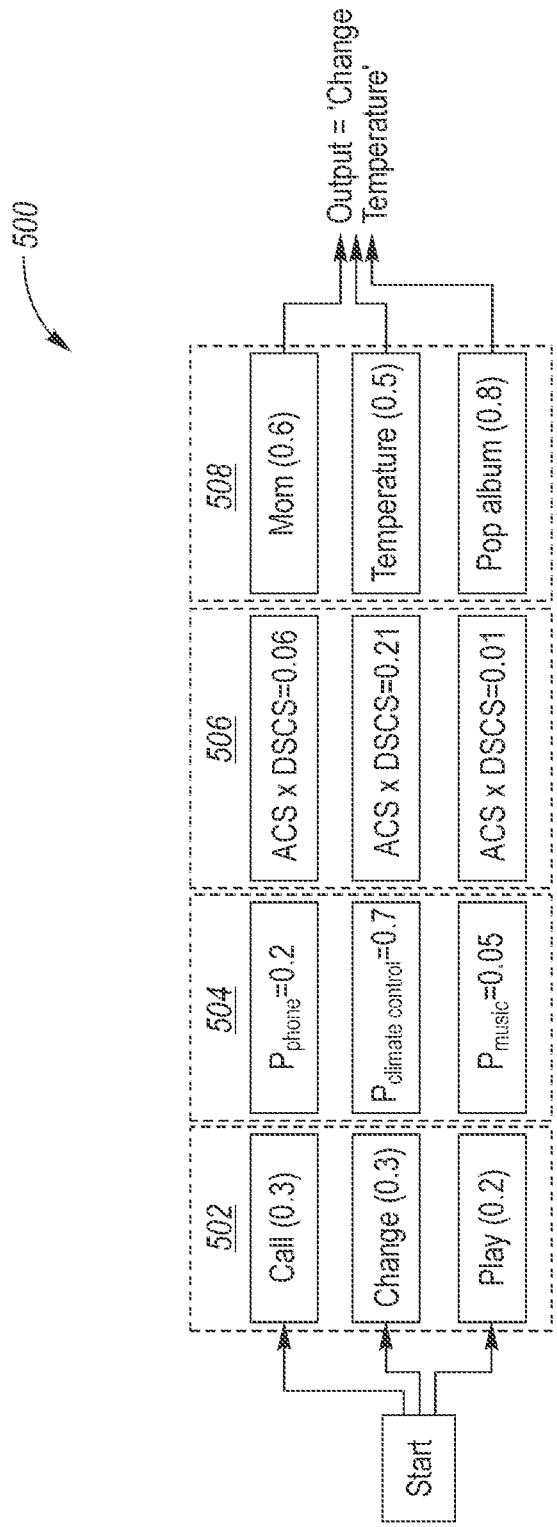
FIG. 5 is a diagram having example values of confidence scores for acoustic and domain-specific language models.

Referring to FIG. 5, an example of at least one embodiment of an algorithm 500 having a plurality of potential recognition paths associated with potential outcomes is depicted. Each of the recognition paths has a first acoustic model speech recognition hypothesis 502 that is determined from a first potential word, phrase, sentence, or series of sentences. A confidence score is determined for each acoustic model speech hypothesis. Related to each of the acoustic hypotheses is a domain-specific language model path having confidence scores 504. The speech recognition hypotheses 502 and domain specific language model confidence scores 504 form common speech domain pairs. Common speech domain pairs may be identified by associating acoustic hypotheses with a dictionary for each domain. For example, the term "Call" would fall within the phone domain, or the term "Change" may fall within the climate control domain. In order to determine the proper speech recognition path, the first acoustic model speech hypothesis is multiplied by the domain-specific confidence score 506 to generate a product. A processor may select the highest ranked path and perform speech recognition on the rest of the audio sample using acoustic model speech recognition 508. The algorithm 500 may repeat a similar process for each word, phrase, or sentence to provide improved speech recognition. The algorithm 500 may determine a specified vehicle command or requested action. These speech recognition iterations may provide enhanced speech recognition because of continuous assessment of whether the domain-specific model should be used.

Figure 6:
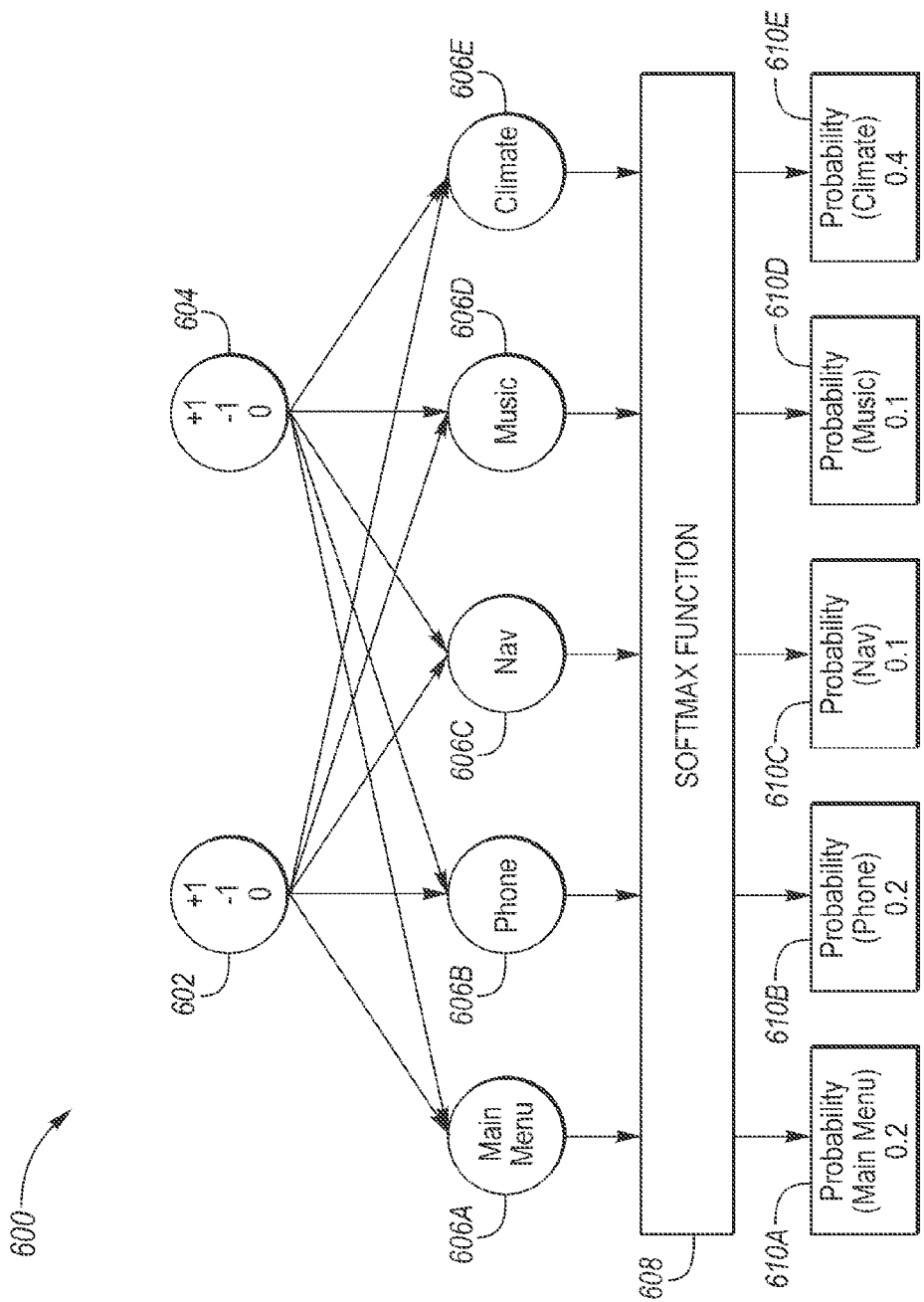
FIG. 6 is a machine-learning algorithm for determining the confidence score of a domain-specific language model.

Referring to FIG. 6, a machine-learning algorithm 600 is depicted. The machine-learning algorithm 600 may be an artificial neural network. The machine-learning algorithm 600 may have two vehicle state inputs 602, 604. The machine-learning algorithm 600 may, in some instances, aggregate vehicle state inputs. The machine-learning algorithm 600 may be fed vehicle state inputs. For example, location state input 602 may have a value of zero to represent a particular location. The zero value for location state input 602 may indicate the vehicle is located at the owner's home. The temperature state input 604 may have a value of negative one to represent a particular temperature condition in the vehicle cabin. A temperature state input 604 value of negative one may represent a temperature less than a threshold. Additional vehicle state inputs may be added. The vehicle state inputs 602, 604 may be combined with weighting factors at each of the different domain-specific language models 606A-606E. Each of the weighting factors is indicated in FIG. 6 as the travel path from the state inputs 602, 604 to each of the domain specific language models 606A-606E. A weighting factor may be associated with and applied to each of the state inputs 602, 604 to obtain the second layer value ("SLV") at each of the domain-specific language models as shown Equation 2.

Now describing Equation 2, a state input 602, $SI_1$, is multiplied by a weighting factor $w_{11}$, which is indicated by the arrow connecting the state input 602 and domain-specific language model 606A. A second state input, $SI_2$, is multiplied by a weighting factor $w_{21}$, which is indicated by the arrow connecting the state input 604 and domain-specific language model 606A.

$$SI_1 \times w_{11} + SI_2 \times w_{21} = SLV \qquad \text{Equation 2}$$

Equation 2 may be applied in similar fashion to each of the other domain-specific language models 606B-606E.

These weighting values may be adjusted to improve the accuracy of the system for the other domains. The weighting values may be set at the factory or adjusted during vehicle use. A Softmax Function 608 is used to logistically regress the data values to determine the resulting probabilities for each domain-specific model confidence score 610A-610E.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A speech recognition method comprising:
   executing, by a processor, a vehicle command identified from a signal containing speech according to a recognition hypothesis selected from a plurality of hypotheses that are each based on a product of a common speech domain pair, the common speech domain pair including (i) one of a plurality of domain-specific language model confidence scores derived from the speech and application of a machine-learning algorithm to vehicle state inputs and (ii) one of a plurality of acoustic model confidence scores; and
   proportionally decreasing, by the processor, the one of the plurality of domain-specific language model confidence scores prior to generation of the product based on the one of the plurality of acoustic model confidence scores falling within a predetermined range that is defined relative to the one of the plurality of domain-specific language model confidence scores.

2. The method of claim 1 wherein the machine-learning algorithm is an artificial neural network.

3. The method of claim 2 wherein the artificial neural network has an output that is related to the commands.

4. The method of claim 1, wherein the vehicle state inputs include weather or traffic.

5. The method of claim 1, wherein the vehicle state inputs include nomadic devices in proximity to the vehicle.

6. The method of claim 1, wherein the vehicle state inputs include conversational history.

7. A speech recognition system comprising:
   a processing device programmed to
      execute a vehicle command identified from a signal containing speech according to a recognition hypothesis selected from a plurality of hypotheses that are each based on a product of a common speech domain pair, the common speech domain pair including (i) one of a plurality of domain-specific language model confidence scores derived from the speech and application of a machine-learning algorithm to vehicle state inputs and (ii) one of a plurality of acoustic model confidence scores, and
      proportionally decreasing the one of the plurality of domain-specific language model confidence scores prior to generation of the product based on the one of the plurality of acoustic model confidence scores falling within a predetermined range that is defined relative to the one of the plurality of domain-specific language model confidence scores.

8. The system of claim 7 wherein the machine-learning algorithm is an artificial neural network.

9. The system of claim 8 wherein the artificial neural network has an output that is related to the commands.

10. The system of claim 7, wherein the vehicle state inputs include weather or traffic.

11. The system of claim 7, wherein the vehicle state inputs include nomadic devices in proximity to the vehicle.

12. The system of claim 7, wherein the vehicle state inputs include conversational history.

* * * * *